May 2, 1950     H. R. LEE     2,506,090
TRAILER HITCH
Filed Dec. 6, 1947
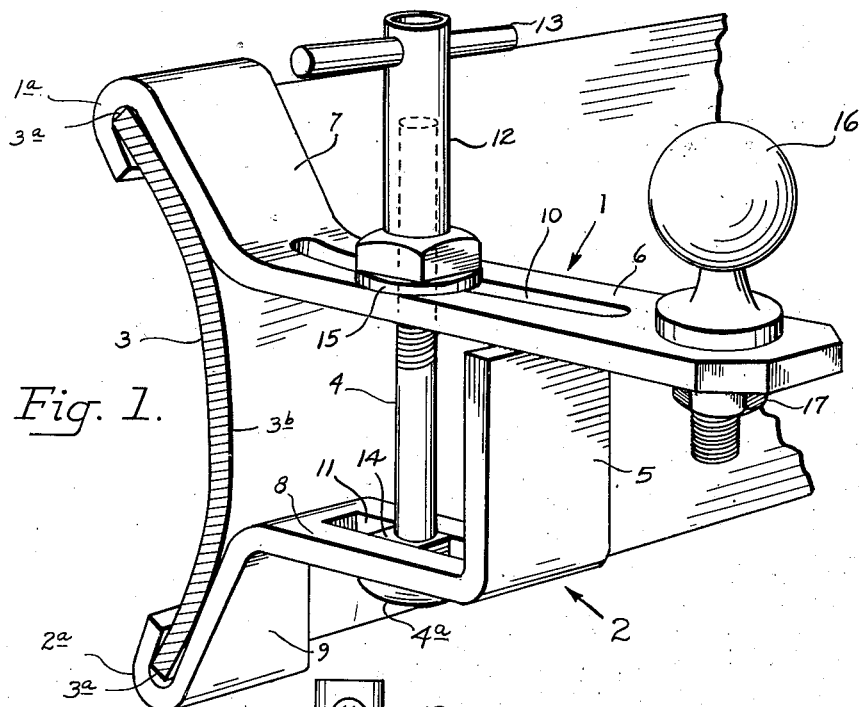
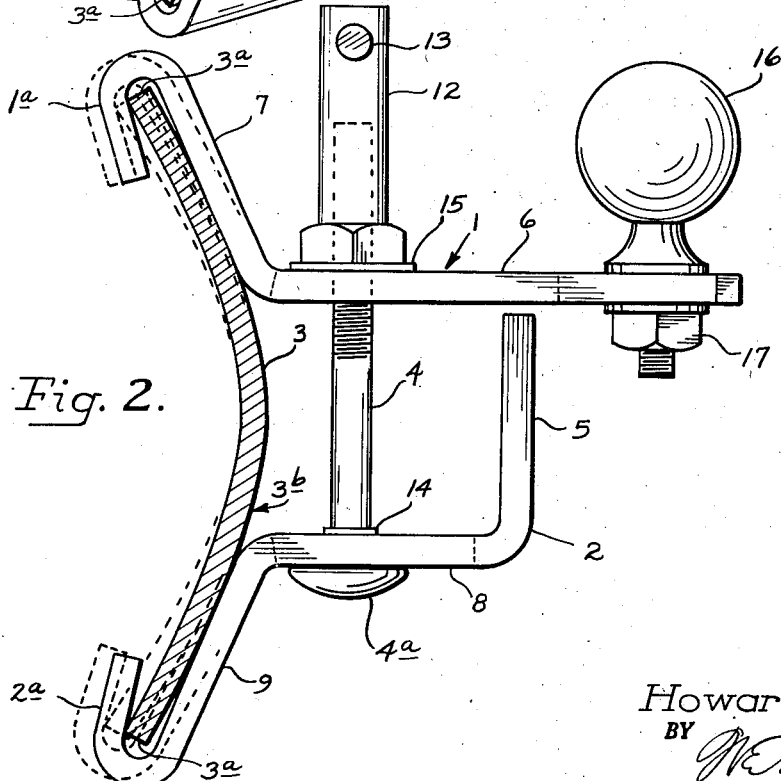
INVENTOR.
Howard R. Lee Patented May 2, 1950

2,506,090

UNITED STATES PATENT OFFICE 2,506,090

TRAILER HITCH

Howard R. Lee, Portland, Oreg.

Application December 6, 1947, Serial No. 790,041

6 Claims. (Cl. 280—33.44)

My invention relates to trailer hitches for vehicles, and has for its general object the provision of a trailer hitch which is of simple construction, which may be securely fastened to the bumper bar of an automobile without marring the latter, and one which has enough inherent elasticity to resist shock and flexure which might cause it to be detached from said bumper.

Many automobiles are constructed at the present time so that skirted portions of the body are arranged in close proximity to the rear bumper, and it is therefore difficult to reach over, under, or behind said bumper to secure a trailer hitch thereto.

A further and more specific object of my invention is to provide a trailer hitch which may overlie the marginal edges of the bumper bar and grip it upon the rear face and upon said margins so as to require no adjustable fastening devices arranged behind the bumper bar. The portions of the hitch are so arranged that they engage the bumper bar upon said rear face and upon the marginal edges and abut with and flex and tend to distort the normal curvature of the bumper bar.

Bumper bars are commonly made of a single width of elastic material. They are usually curved or bent transversely, and, due to said deformation, are relatively stiff. Another further object of my invention is to provide a hitch which takes advantage of said structural characteristics by providing clamping members, each having a claw-like end which extends over and behind the marginal edges of the bumper bar, and has a screw-type fastening device for pulling the two clamping members together to grip and to flex reversely said bumper bar. The adjacent faces of said clamping members are obliquely formed and subtend an angle greater than that subtended by planes extending tangentially to the portions of the face of the bumper bar adjacent the marginal edges thereof, and thus contact said face, and by their grip tend to flatten or reduce the curvature or deformation of the bumper bar.

Other and further details of my invention, and other structural features thereof, are hereinafter described with reference to the accompanying drawings, in which:

Fig. 1 is a fragmentary perspective view of a bumper bar showing a trailer hitch embodying my invention; and Fig. 2 is a more or less diagrammatic view of the manner in which the bumper bar is seized and distorted when gripped by a trailer hitch embodying my invention, to provide a secure grip on said bumper bar.

A trailer hitch embodying my invention comprises a pair of clamping members 1 and 2, each of which has a claw-like end 1a—2a, respectively, which overlies and engages a marginal edge 3a of a bumper bar 3. Said trailer hitch is particularly adapted to be joined to a bumper bar made of a relatively wide band of steel which is formed into concavo-convex cross-section. The marginal edges 3a therefor lean rearwardly from the face 3b of said bumper bar, and thus said claw-like ends may engage said marginal edges securely.

The clamping members are joined by a screw-type fastening device 4, which passes through the clamping members intermediate the ends thereof. One of said clamping members, and preferably the lowermost clamping member 2, has an upturned end 5 which is arranged substantially normal to a plane section 6 of said clamping member 1, which upturned end 5 may abut against the clamping member 1. Said upturned end section 5 of said clamping member, when in abutment, serves as a fulcrum upon which the clamping member 1 rocks when it is drawn toward the other clamping member 1 by the fastening device 4. Said clamping member 1 has an obliquely formed section 7, connecting the plane section 6 thereof and its claw-like end 1a. The vertical angle which said section makes with respect to the plane section 6 is greater than that which a plane extending tangentially to the curvature of the upper marginal edge of said bumper bar would make. Thus said obliquely formed section bears against the bumper bar and tends to flatten or reverse the curvature thereof. Thus the hitch provides multiple points of contact with said bumper bar. That is, the hitch contacts the bumper bar where the claw-like end and the portion of said obliquely formed section intermediately adjacent thereto engage the concave back face of the bumper bar, and intermediate portions engage the front face thereof.

The lower clamping member 2 is similarly formed, having a plane section 8 joined to the claw-like end 2a by an obliquely formed section 9. The obliquely formed section 9 extends upwardly at substantially the same angle as that of the obliquely formed section 7, but oppositely. In said plane section 6 is an elongated aperture 10, which registers with a shorter elongated aperture 11 in the clamping member 2. The screw-type fastening device passes between said apertures, and a tubular nut element 12, having a transverse handle 13 thereon, is in threaded engagement with the fastening device 4 to pull said two clamping members together. I preferably form a squared shoulder 14 on the head 4a of the fastening device 4 so as to prevent said fastening device from turning when the nut element is threaded tightly thereon. I preferably arrange a washer 15 under said nut for the usual purpose. The plane section 6 of the clamping member 1 extends outwardly beyond the upturned end 5 of the other clamping member 2 a distance sufficient to carry a ball 16 to engage a socket of a hitch connection to a trailer. Said ball is secured to the plane section 6 by a nut 17 in the usual manner.

I have found that it is desirable to have several different sizes of clamping members 2 to accommodate bumper bars of differing widths. Thus the elongated aperture 10 in the clamping member 1 extends laterally beyond the upturned end 5 in the clamping member 2, as shown. If a clamping member 2 is used which has an upturned end of greater length, it usually extends farther towards the ball 16, and thus the elongated aperture 10 is made sufficiently long to accommodate this range of sizes of cooperating clamping members 2. The inner ends of said apertures 10 and 11, that is the ends adjacent the obliquely formed sections 7 and 9 of the clamping members 2 and 1, respectively, pass to or slightly beyond the point of joinder of the obliquely formed sections and the plane sections of each of the clamping members. This permits the screw-type fastening devices to pass through said clamping members as close to the bumper bar as is practicable. The clamping members are made of relatively tough elastic steel, which flex slightly under the pressure exerted by the screw-type fastening device, and thus the distortion and elasticity of the clamping members, together with the distortion and elasticity of the bumper bar, tend to accommodate any racking strains without loosening the hold of the clamping members upon the bumper bar. The arrangement of the claw-like ends and the adjacent obliquely formed sections of said clamping members provides a secure grip on the bumper bar, both to withstand pulling strains, as when towing a trailer, and pushing strains generated in backing a trailer and in which the trailer hitch is subject to compression.

As is shown in Fig. 2 of the drawings, the clamping members engage the marginal edges of the bumper and the oblique adjacent portions abut against the front face thereof. Continued tightening of the screw-type fastening device causes the plane portions of the clamping members to be pulled towards each other until parallelism is approached. The oblique portions are so formed that they tend to engage the face of the bumper bar between the marginal edges thereof, and tend to deform said bars by turning them in a direction opposed to their normal curvature. Said bumper bars are preferably quite wide and are made of tough elastic steel. Thus said deformation is well within the elastic limits of said bars, and the curvature is such that stiffness of said bars is not substantially affected. The grip of said clamping members, however, tends to provide a tight engagement, and the inherent elasticity of the clamping members and said bumper bars tend to cause the parts to be firmly engaged. The oblique portions of the clamping members bear against the face of the bumper bar, and thus are capable of resisting compression, as when a car is pushing a trailer through said trailer hitch. Likewise, the engagement of the hook-like ends behind the rearwardly sloping margins of the bumper bars provides adequate engagement so that the hitch securely engages the bumper bars when a trailer is being towed by a car by means of said hitch. Said pinching or distorting action of the trailer hitch thus provides a tight, firm, secure engagement between the trailer hitch and the bumper bar, both for pulling and pushing the trailer. It also provides good lateral support, so that the trailer hitch does not tend to tip about its point of engagement with a bumper bar, as when the trailer is being pushed by an automobile or other towing vehicle.

I claim:

1. In combination with a bumper bar of curved cross-section for a vehicle, a trailer hitch comprising a pair of cooperating clamping members each having a claw-like end adapted to overlie and engage the marginal edges of said vehicle bumper, one of said members carrying a towing connection thereon, said clamping members each having divergent obliquely formed portions adjacent said claw-like ends and parallel central portions further spaced from said claw-like ends, and a fastening device for pulling said clamping members together, the angle of divergence of said obliquely formed portions being substantially greater than that subtended by planes extending tangentially to the portions of the face of said bumper bar adjacent the marginal edges thereof.

2. A trailer hitch comprising a pair of cooperating clamping members each having a claw-like end adapted to overlie and engage the marginal edges of a vehicle bumper of curved cross section, one of said members carrying a towing connection, said clamping members each having divergent obliquely formed portions adjacent said claw-like ends and parallel central portions further spaced from said claw-like ends, said parallel central portions each having a slotted aperture formed therein, said apertures being alined with each other, and a fastening device extending through said alined apertures for pulling said clamping members together, the angle of divergence of said obliquely formed portions being substantially greater than that subtended by planes extending tangentially to the portions of the face of said bumper bar adjacent the marginal edges thereof.

3. A trailer hitch comprising a pair of cooperating clamping members each having a claw-like end adapted to overlie and engage the marginal edges of a vehicle bumper of curved cross section, one of said members carrying a towing connection, said clamping members each having divergent obliquely formed portions adjacent said claw-like ends and parallel central portions further spaced from said claw-like ends, said parallel central portions each having a slotted aperture formed therein, said apertures being alined with each other, and a fastening device extending through said alined apertures for pulling said clamping members together, one of said clamping members having a portion extending generally normal to its central portion and positioned and arranged to abut with the other clamping member at a point at the far side of the fastening device from the claw-like end of said latter member, thus constituting a fulcrum for said latter device when pivoting under the influence of said fastening device, the angle of divergence of said obliquely formed portions being substantially greater than that subtended by planes extending tangentially to the portions of the face of said bumper bar adjacent the marginal edges thereof.

4. A trailer hitch comprising a pair of cooperating flexible and elastic clamping members each having a claw-like end adapted to overlie and engage the marginal edges of a vehicle bumper of curved cross section, one of said members carrying a towing connection, said clamping members each having divergent obliquely formed portions adjacent said claw-like ends and parallel central portions further spaced from said claw-like ends, said parallel central portions each having a slotted aperture formed therein, said apertures being alined with each other, and a fastening device extending through said alined apertures for pulling said clamping members together, one of said clamping members having a portion extending generally normal to its central portion and positioned and arranged to abut with the other clamping member at a point at the far side of the fastening device from the claw-like end of said latter member, thus constituting a fulcrum for said latter member when pivoting under the influence of said fastening device, the angle of divergence of said obliquely formed portions being substantially greater than that subtended by planes extending tangentially to the portions of the face of said bumper bar adjacent the marginal edges thereof.

5. A trailer hitch comprising a pair of cooperating clamping members each having a claw-like end adapted to overlie and engage the marginal edges of a vehicle bumper of curved cross section, one of said members carrying a towing connection, said clamping members each having divergent obliquely formed portions adjacent said claw-like ends and parallel central portions further spaced from said claw-like ends, said parallel central portions each having a slotted aperture formed therein, said apertures being alined with each other, and a screw-type fastening device extending through said alined apertures for pulling said clamping members together, one of said clamping members having a portion extending generally normal to its central portion and positioned and arranged to abut with the other clamping member at a point at the far side of the fastening device from the claw-like end of said latter member, thus constituting a fulcrum for said latter member when pivoting under the influence of said fastening device, the angle of divergence of said obliquely formed portions being substantially greater than that subtended by planes extending tangentially to the portions of the face of said bumper bar adjacent the marginal edges thereof.

6. A trailer hitch comprising a pair of cooperating clamping members each having a claw-like end adapted to overlie and engage the marginal edges of a vehicle bumper of curved cross section, one of said members carrying a towing connection, said clamping members each having divergent obliquely formed portions adjacent said claw-like ends and parallel central portions further spaced from said claw-like ends, said parallel central portions each having a slotted aperture formed therein, said apertures being alined with each other, and a screw-type fastening device extending through said alined apertures for pulling said clamping members together, said fastening device having a non-circular shoulder formed thereon slidably engaging one of said slotted apertures, thereby to restrict rotation of said fastening device, one of said clamping members having a portion extending generally normal to its central portion and positioned and arranged to abut with the other clamping member at a point at the far side of the fastening device from the claw-like end of said latter member, thus constituting a fulcrum for said latter member when pivoting under the influence of said fastening device, the angle of divergence of said obliquely formed portions being substantially greater than that subtended by planes extending tangentially to the portions of the face of said bumper bar adjacent the marginal edges thereof.

HOWARD R. LEE.

REFERENCES CITED

The following references are of record in the file of this patent:

UNITED STATES PATENTS

| Number | Name | Date |
| --- | --- | --- |
| 2,060,066 | Goin | Nov. 10, 1936 |
| 2,250,661 | Thorp et al. | July 29, 1941 |
| 2,258,678 | Elwood | Oct. 14, 1941 |